United States Patent
Li et al.

(10) Patent No.: US 7,169,687 B2
(45) Date of Patent: Jan. 30, 2007

(54) LASER MICROMACHINING METHOD

(75) Inventors: Eric J. Li, Chandler, AZ (US); Sergei L. Voronov, Chandler, AZ (US); Christopher L. Rumer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 10/980,943

(22) Filed: Nov. 3, 2004

(65) Prior Publication Data

US 2006/0091125 A1    May 4, 2006

(51) Int. Cl.
*H01L 21/00* (2006.01)
(52) U.S. Cl. .................................... 438/463
(58) Field of Classification Search ................ 438/463
See application file for complete search history.

(56) References Cited

U.S. PATENT DOCUMENTS

| | | | |
|---|---|---|---|
| RE37,585 E | 3/2002 | Mourou et al. | |
| 6,621,040 B1 | 9/2003 | Perry et al. | |
| 6,744,009 B1 * | 6/2004 | Xuan et al. | 219/121.67 |

OTHER PUBLICATIONS

Braun, A. et al., "Self-Channeling of High-Peak-Power Femtosecond Laser Pulses in Air;" Optics Letters, vol. 20, No. 1 (Jan. 1, 1995).

Stoian, R. et al., "Surface Charging and Impulsive Ion Ejection during Ultrashort Pulsed Laser Ablation," Physical Review Letters, vol. 88, No. 9, pp. 097603-1 to 097603-4 (Mar. 4, 2002).

Sugioka, Koji et al., "Novel Technology for Laser Precision Microfabrication of Hard Materials," Riken Review No. 50, Third International Symposium on Laser Precision Microfabrication (LPM 2002), pp. 36-42 (Jan. 2003).

Dausinger, Friedrich, "Femtosecond Technology for Precision Manufacturing: Fundamental and Technical Aspects," RIKEN Review No. 50, Third International Symposium on Laser Precision Microfabrication (LPM 2002), pp. 77-82 (Jan. 2003).

Rizvi, Nadeem H. et al., "Micromachining of Industrial Materials with Ultrafast Lasers," Proceedings of the 15th International Congress on Applications of Lasers and Electro-Optics (ICALEO '01), 10 pages Oct. 15-18, 2001.

Rizvi, Nadeem H., "Femtosecond Laser Micromachining: Current Status and Applications," RIKEN Review No. 50, Third International Symposium on Laser Precision Microfabrication (LPM 2002), pp. 107-112 (Jan. 2003).

(Continued)

*Primary Examiner*—Lex H. Malsawma

(57) ABSTRACT

A method is described for laser scribing or dicing portions of a workpiece using multi-source laser systems. In one embodiment, a first laser uses multiphoton absorption to lower the ablation threshold of portions of the workpiece prior to a second laser ablating the portions of the workpiece. In an alternative embodiment, a first laser uses high energy single-photon absorption to lower the ablation threshold of portions of the workpiece prior to a second laser ablating the portions of the workpiece.

24 Claims, 3 Drawing Sheets

OTHER PUBLICATIONS

Song, K.H. et al., "Mechanisms of Absorption in Pulsed Excimer Laser-Induced Plasma," Applied Physics A, vol. 65, pp. 477-485 (1997).

Herrmann, Thomas et al, "Slashing the Costs of High-Precision Micromachining," Photonics Spectra, Laurin Publishing (Jun. 2004).

Arrigoni, Marco, "Femtosecond Lasers Carve out a Niche in Micromachining," Photonics Spectra, Laurin Publishing (Jun. 2004).

Lumera Laser GmbH, "Slashing the Costs for High Precision Micromachining: New Ultrashort Pulse Laser for Micromachining," presentation at the 2004 Photonics Applications System Technologies Conference, Baltimore, Maryland (May 19, 2004).

Resonetics, Inc., "Laser Micromachining Seminar," 112 pages, located at http://www.resonetics.com/PDF/MicromachiningSeminar.pdf (1999).

Subramanyan, Pradeep K. et al, "Laser Micromachining in the Microelectronics Industry: Emerging Applications," white paper from Electro Scientific Industries, Inc., located at http://www.esi.com/products/pdf/cft/micromachining.pdf, 10 pages, publication date unknown (published after May 2002).

* cited by examiner

LASER MICROMACHINING METHOD

FIELD OF THE INVENTION

Embodiments of the present invention relate generally to micromachining and more specifically to laser micromachining of semiconductor substrates.

RELATED APPLICATIONS

The present application is related to the subject matter of U.S. patent application Ser. No. 10/972,108 of Li entitled "Laser Micromachining Method," and filed Oct. 21, 2004. U.S. patent application Ser. No. 10/972,108 is assigned to the assignee hereof.

FIELD OF THE INVENTION

Embodiments of the present invention relate generally to micromachining and more specifically to laser micromachining of semiconductor substrates.

BACKGROUND OF THE INVENTION

Semiconductor wafer singulation is typically accomplished using saws. However, sawing may not be suitable for cutting through advanced-materials formed on the wafer surface (i.e., low-k dielectrics). One alternative includes using lasers to remove scribe line material prior to sawing. Laser scribing, however, is confronted with a number of challenges.

Differences in ablation thresholds of materials formed on the wafer can complicate the laser ablation process. Nanosecond neodymium yttrium aluminum garnet (Nd:YAG) lasers, which are considered conventional, have a wavelength of 355 nanometers (nm). This wavelength corresponds to a photon energy of 3.5 electron volts (eV), which is higher than the bandgap of silicon (1.12 eV) and silicon carbide (2.86 eV), but less than that of silicon nitride (5.0 eV) and silicon dioxide (9.0 eV). When a laser's photon energy is less than a material's bandgap, the material is transparent to the laser. So, while conventional lasers may be capable of ablating silicon and silicon carbide, ablation of silicon nitride and silicon dioxide is more difficult.

When ablating multiple layers in a film stack, the laser's power must be set to ablate the layer with the highest ablation threshold, even if this means the power is too high for other layers. If an overlying layer is transparent, the laser's beam can transmit through it and ablate underlying layers. Underlying layer ablation can proceed explosively and thereby produce thermal and mechanical stress, damage, peeling, and cracking in the film stack, as well as generate surface particles.

Laser beams with shorter wavelengths and high photon energies can be more effective for scribing semiconductor materials than conventional lasers. However, there are a number of limitations associated with these systems. Shorter wavelength (266 nm) Nd:YAG lasers (4.7 eV photon energy) are limited by their low output power. Higher power ultraviolet (UV) lasers, such as excimer lasers (e.g., Krypton Fluoride (KrF) lasers (248 nm or 5.0 eV photon energy) and Fluorine ($F_2$) lasers (157 nm or 7.9 eV photon energy) are limited by their low repetition rates, limited power output, and reliability. In addition, complex and costly UV optical components are needed to project and focus the shorter wavelength laser beams onto the workpiece in order to achieve the power densities needed for ablation.

Short pulse duration lasers (i.e. ultrafast lasers) can be used to reduce stress, damage, and surface particle contamination issues. Unlike conventional lasers, which ablate material by transferring energy to the materials lattice system to induce melting and evaporation, ultrafast lasers ablate by exciting the material's electrons to higher energy states (i.e. the conduction band) or even the vacuum level directly by single or multi-photon absorption (a nonlinear effect due to the extremely high electromagnetic field strength afforded by ultrafast laser systems) before energy transfer from the electronic system to the lattice system occurs. These lasers produce ultrafast bond scission, whereby lased material is removed with significantly reduced thermal and mechanical stress. However, while the overall laser scribing quality of ultrafast lasers may be superior to that of conventional lasers, they are limited by their low processing throughputs and the difficulties related to their stability, maintenance, and cost.

Figure 1A:
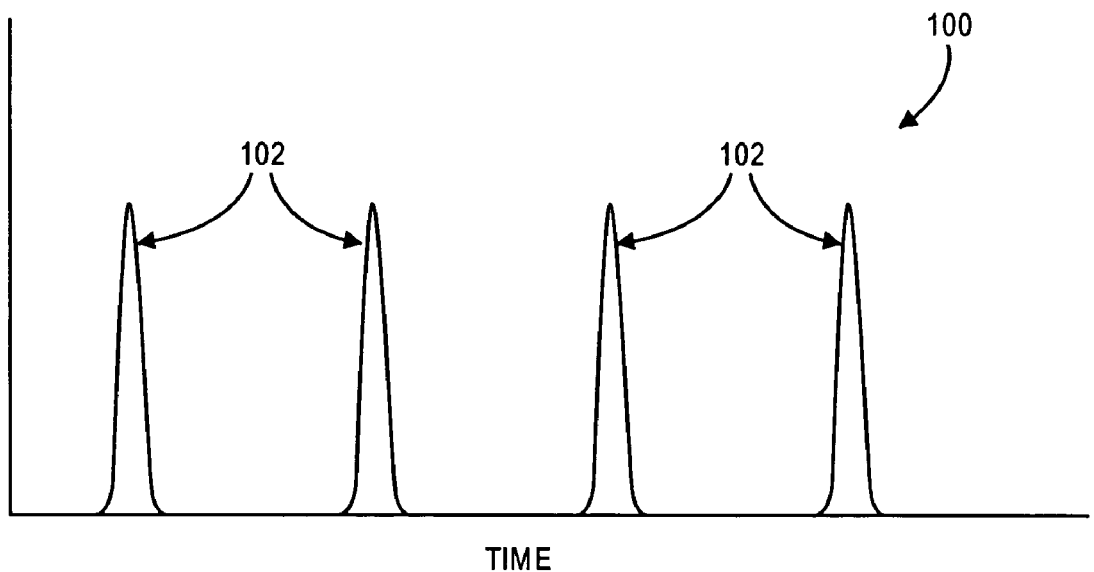
FIG. 1A illustrates a nanosecond laser pulse train using a conventional laser scribing/dicing process.

It will be appreciated that for simplicity and clarity of illustration, elements in the drawings have not necessarily been drawn to scale. For example, the dimensions of some of the elements may be exaggerated relative to other elements for clarity. Where considered appropriate, reference numerals have been repeated among the drawings to indicate corresponding or analogous elements.

DETAILED DESCRIPTION

In the following detailed description, a method for laser micromachining a workpiece is disclosed. Reference is made to the accompanying drawings within which are shown, by way of illustration, specific embodiments by which the present invention may be practiced. It is to be understood that other embodiments may exist and that other structural changes may be made without departing from the scope and spirit of the present invention.

Embodiments of the present invention relate generally to the concept of lowering the ablation threshold of a material to facilitate its ablation at reduced power levels. More specifically, embodiments of the present specification disclose a dual source process whereby a first energy source lowers the ablation threshold of a material so a second energy source can ablate it at a lower power level than would otherwise be possible. While embodiments herein disclose the use of lasers, one of ordinary skill appreciates that these embodiments are not so limited. Other energy sources capable of lowering a material's ablation threshold and/or ablating the material fall within the scope and spirit of the present invention. In addition, the workpiece disclosed herein can be a semiconductor wafer, in which case the workpiece portion can be a scribe line region (street) and lowering the ablation threshold and ablating the workpiece portions scribes or dices the wafer. Alternatively, the workpiece can include any number of structures capable of being micromachined.

In one embodiment, ablation is accomplished by serially projecting a series of pulses from two different laser systems onto a workpiece. The first laser system uses multiphoton absorption to lower the ablation threshold of portions of the workpiece prior to a second laser ablating the portions of the workpiece. The first laser system can be a low average power ultrafast laser that has pulse durations on the order of femtoseconds or picoseconds and a pulse repetition rate of less than approximately one megahertz. The second laser system can be a higher average power laser system that has pulse durations on the order of nanoseconds and a pulse repetition rate that is substantially the same as the first laser system.

The first laser system's pulse (first pulse) can be initiated prior to initiating the second laser system's pulse (second pulse). The first and second laser pulses can be synchronized so as to temporally and spatially overlap each other. The first and second laser pulses can be synchronized such that each of the ultrafast laser pulses is initiated prior to initiating each of the nanosecond laser pulses or such that each of the ultrafast laser pulses is initiated and terminated prior to initiating each of the nanosecond pulses. One of ordinary skill appreciates that many combinations can exist with respect to the relative timing of the first and second pulses.

Pulses from the lower-power ultrafast laser excite the electron energy levels in portions of the workpiece material through single or multi photon absorption and thereby creates a non-equilibrium electronic state that has a lower ablation threshold. The higher power laser pulse then ablates the workpiece portions via normal melting and evaporation, but at a substantially lower power density, thereby resulting in significantly reduced thermal and mechanical stress to the surrounding area.

In an alternative embodiment, ablation is accomplished by simultaneously projecting a series of pulses from multiple laser systems, each having different wavelengths, onto a workpiece. Here, the first laser system(s) use high energy single-photon absorption to lower the ablation threshold of portions of the workpiece and then the second laser system(s) ablates the portions. In one embodiment, two laser systems are used. The first laser system (the secondary beam) has a shorter wavelength and is used to excite electrons in the material from the valence band to the conduction band. The other laser system (the primary beam) has a longer wavelength and is used to excite electrons in the conduction band (or the defect states below the conduction band) to the vacuum level thereby ablating the material. These embodiments and variations thereof may be better understood with respect to FIGS. 1–4.

Shown in FIG. 1A is an example illustration of a conventional nanosecond laser pulse train 100 produced by a 355 nm Nd:YAG laser. The pulse train includes pulses 102, each having durations of approximately 10–100 nanoseconds. Semiconductor substrates scribed with nanosecond lasers such as this can encounter problems related to heat (due to the thermal nature of nanosecond laser ablation) and limited pulse fluence (i.e., the inability to sufficiently ablate some materials in the substrate's film stack, for example, silicon dioxide).

Figure 1B:
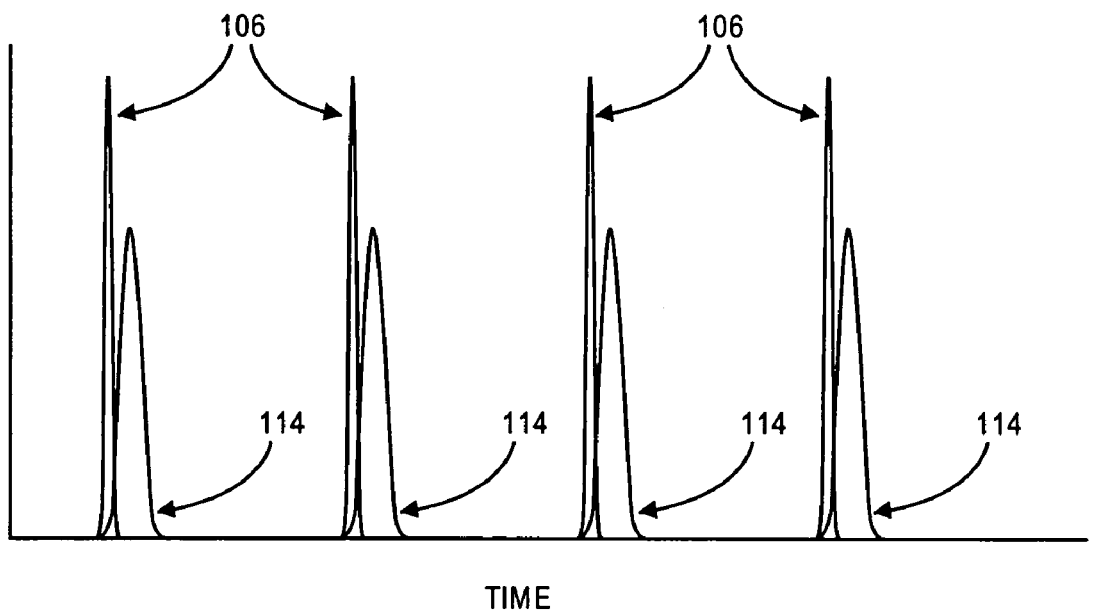
FIG. 1B illustrates a pulse train that includes a combination of ultrafast-nanosecond pulses in accordance with an embodiment of the present invention.

Shown in FIG. 1B is an illustration of a pulse train that incorporates one embodiment of the present invention. This embodiment advantageously incorporates the benefits of using the high instantaneous electromagnetic field strength associated with short pulse duration laser systems with the high output power, stability, reliability, optical quality, and low cost associated with long pulse duration laser systems.

The shorter pulse duration laser is used to lower the ablation threshold of the material so that the longer pulse duration laser can then ablate it.

The pulse train shown in FIG. 1B, is similar to that shown in FIG. 1A, except that ablation occurs as the result of two laser pulses being projected onto a workpiece instead of one. As shown in FIG. 1B, the two laser pulses 106 and 114 are timed so as to coincide with each other. Laser pulse 106 has a shorter duration, and laser pulse 114 has a longer duration. In one embodiment, the shorter pulse duration laser is an ultrafast laser and the longer pulse duration laser is a nanosecond laser. Pulses from the two lasers are synchronized temporally and spatially, whereby the ultrafast laser irradiates the substrate to lower the ablation threshold of portions of the semiconductor substrate and then the nanosecond laser ablates those portions. The pulses 106 and 114 show one example of the relative timing relationship between the ultrafast and nanosecond pulses. The pulses 106 and 114 are not necessarily drawn to scale with respect to pulse duration and amplitude.

In one specific example of this embodiment, the nanosecond laser operates at a conventional wavelength of 355 nm to maximize the overall optical absorption of materials in the film stack such as silicon and silicon compounds. The wavelength of the ultrafast laser pulse 106 depends upon the type of the laser gain medium, and it is usually in the range 700–1500 nm (infrared light region). The duration of the ultrafast laser pulse is typically less than 10 picoseconds. In one embodiment the ultra fast laser pulse duration is less than 1000 femtoseconds. The nanosecond laser pulse duration is typically in a range of 10–100 nanoseconds.

The repetition rate of the ultrafast laser 106 is preferably less than one megahertz. In one specific example, the repetition rate is fixed in a range of approximately 10–80 kilohertz (kHz). The repetition rate of the nanosecond laser pulses 114 is adjusted to match that of the ultrafast laser. Typically the ultrafast laser pulses arrive at the work piece before, at, or around the same time as the nanosecond laser pulses in order to prepare or excite the material's system to the proper non-equilibrium state. The ultrafast laser pulse 106 can begin and end before the nanosecond laser pulse 114 starts. Alternatively, the ultrafast laser pulse 106 can overlap temporally and/or spatially with the nanosecond laser pulse 106. The relative time delay between the ultrafast and nanosecond pulses can be varied and optimized for best overall scribing and/or dicing quality and throughput.

The timing of the laser pulses 106 and 114 shown in FIG. 1B is such that the low average power ultrafast laser excites the lased material's electronic energy system through single or multiple-photon absorption processes and thereby creates a non-equilibrium electronic state that lowers the material's ablation threshold. The higher power nanosecond laser pulse, which follows the ultrafast laser pulse, ablates the material via normal melting and evaporation while the material's ablation threshold is lowered. Due to the reduction in the material's ablation threshold, ablation can be accomplished using a reduced power density as compared to conventional nanosecond laser scribing/dicing. This can significantly reduce size and of the heat affected zone (HAZ) and the magnitude of the thermal and mechanical stresses imparted into surrounding areas. Because the materials can now be ablated using an overall lower power as compared to a conventional nanosecond laser processing, incidents of explosive ablation are reduced. Consequently, less damage and fewer surface contaminants are produced. And, because it is the nanosecond laser that actually removes the material, not the ultrafast laser, the throughput of such an integrated system has the capability of being significantly higher than that of a standalone ultrafast laser.

The advantages of using this integration scheme to ablate wide bandgap materials can be explained and further appreciated by explaining its use to ablate silicon dioxide. Silicon dioxide, which has an electronic bandgap of approximately 9.0 electron volts (eV) in the single crystal structure is substantially transparent to nanosecond laser pulses at a 355 nm wavelength and consequently has a very high ablation threshold. It is considered by those of ordinary skill to be one of the most difficult materials to ablate with conventional lasers. Using the dual-source laser ablation process disclosed in this embodiment, the ablation threshold of the silicon dioxide can be reduced by exposing it to an ultrafast laser pulse prior to (or during) exposure to a nanosecond laser pulse. In doing so, electrons in silicon dioxide lattice can be excited (via nonlinear multi-photon absorption) across the bandgap from the valence band to the conduction band (i.e., become ionized). Once in the conduction band, the electron now only needs approximately 0.9 eV of photon energy to be further excited to the vacuum level. Thus, if the nanosecond laser pulse is applied while the electrons are in the conduction band, it can additionally excite the freed electrons to the vacuum level. Once in the vacuum level, bond scission occurs and the material gets removed. The power density needed for material removal is significantly reduced compared to conventional single-source nanosecond laser scribing/dicing processes.

In an alternative embodiment, a laser scribing process is disclosed that combines the benefits of a short wavelength laser system (high photon energies) and a long wavelength laser system (lower photon energies, but higher output power). The shorter wavelength laser is used as a secondary beam that excites the electrons from the valence band to the conduction band (or the defect states below the conduction band). The longer wavelength laser is used as a primary beam that further excites the electrons from the excited states to vacuum levels, thereby leading to improved bond scission and material removal.

In one embodiment, a short wavelength is defined as any wavelength below 354 nm and a long wavelength is defined as any wavelength greater than or equal to 355 nm (for example in the case of a dual-source 266 nm Nd:YAG (short wavelength laser) 355 nm Nd:YAG (long wavelength laser) configuration. In an alternative embodiments, a short wavelength can defined as any wavelength less than or equal to 157 nm and a long wavelength can be defined as any wavelength greater than or equal to 248 nanometers (for example in the case of a dual-source 157 nm $F_2$ (short wavelength laser) 248 nm excimer (long wavelength laser) configuration. One of ordinary skill recognizes that these embodiments are exemplary and are not intended to limit what constitutes short or long wavelengths.

Due to this enhanced excited state absorption phenomenon, the secondary beam which has a lower power density can produce a substantial increase in the absorption coefficient of the material being processed for the primary beam and a corresponding decrease in the material's ablation threshold. This can be advantageous when laser scribing/dicing materials that have bandgaps (or defect state energy levels) which are less than the photon energy of the primary beam because now less laser power may be needed to produce ablation. This translates to reduced thermal and mechanical stress and less damage to the surrounding areas.

This embodiment enables more efficient scribing of semiconductors whose bandgap (or defect state energy level) is larger than the individual photon energy of the primary beam but less than or close to that of the secondary beam. In other words, this embodiment facilitates scribing of materials which are transparent to the primary beam (i.e., silicon dioxide). Moreover, because the scribing patterns are determined only by the primary beam, the stability, uniformity, and optical quality of the secondary beam are not crucial. This means that currently available shorter wavelength laser systems can be used to improve laser efficiency and quality even if their overall performance is less than satisfactory.

A fundamental concept underlying this multi-wavelength laser scribing process is to utilize a two-photon absorption process (i.e., a process whereby single-photon absorption from the secondary laser lowers the ablation threshold of the material and then single-photon absorption from the primary laser ablates the material). In this approach, the secondary beam provides the energy needed for the electrons to cross the bandgap in the lased material and thereby create a non-equilibrium distribution of electron populations on the excited states in the conduction band or the defect states below the conduction band. Efficient and enhanced scribing happens when these excited electrons absorb the photon energy of the primary beam and are excited all the way to the vacuum level. Since the energy difference between these excited states and the vacuum level is generally much smaller than the bandgap energy itself, enhanced absorption of the primary beam is achieved even though the semiconductor material is transparent to the primary beam under normal conditions.

The advantages of using a multi-wavelength laser process to enhance excited state absorption can be demonstrated in the case of laser ablation of fused silicon dioxide using a combination 248 nm excimer laser system (primary beam) and a low-power 157 nm (7.9 eV photon energy) fluorine ($F_2$) laser system (secondary beam). While the bandgap of silicon dioxide is approximately 9.0 eV, its absorption edge starts at around 7.3 eV due to the existence of defect states below the conduction band. The high energy photons from the low power $F_2$ laser system excite the electrons in the valence band to these defect states. Since the energy difference between these states and the vacuum level is only about 2.6 eV, the trapped electrons can be easily excited by the photons from the excimer laser system, resulting in bond scission and efficient material removal. Due to the secondary nature of the $F_2$ laser beam, its stability, uniformity, reliability, and overall optical quality are not crucial to the ablation process. No additional costly and complex UV optical components are needed.

Secondary beam sources are not limited to those lasers having short wavelengths and high powers (i.e., excimer and $F_2$ lasers). Excited state absorption can also be accomplished using mature laser system technologies to improve scribing efficiency and quality over conventional laser processes. For example, a 355 nm Nd:YAG laser (primary beam) can be combined with a 266 nm Nd:YAG laser (secondary beam) to form a multi-wavelength laser scribing system. The secondary beam creates the non-equilibrium distribution of electron populations in the excited states above or near the bandgap. The primary beam then ablates the excited electrons resulting in bond scission and final material removal. Due to its extremely high bandgap, $SiO_2$ may continue to be problematic even with this particular multi-wavelength approach. But those attempting to ablate other semiconductive materials, such as silicon, silicon carbide, low-k materials and silicon nitride can benefit significantly in terms of scribing efficiency and quality by using this embodiment.

Figure 2:
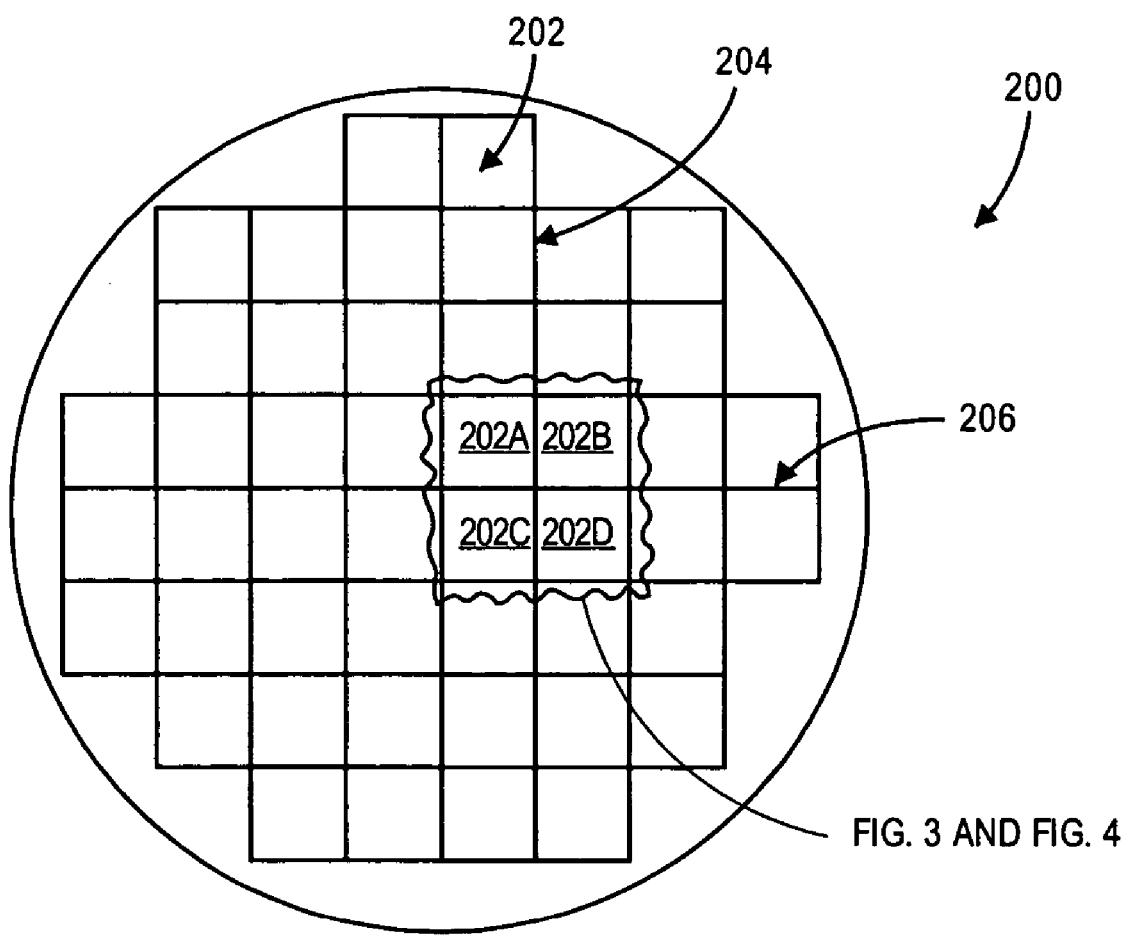
FIG. 2 illustrates a top-down view of die formed on a semiconductor substrate.
Figure 3:
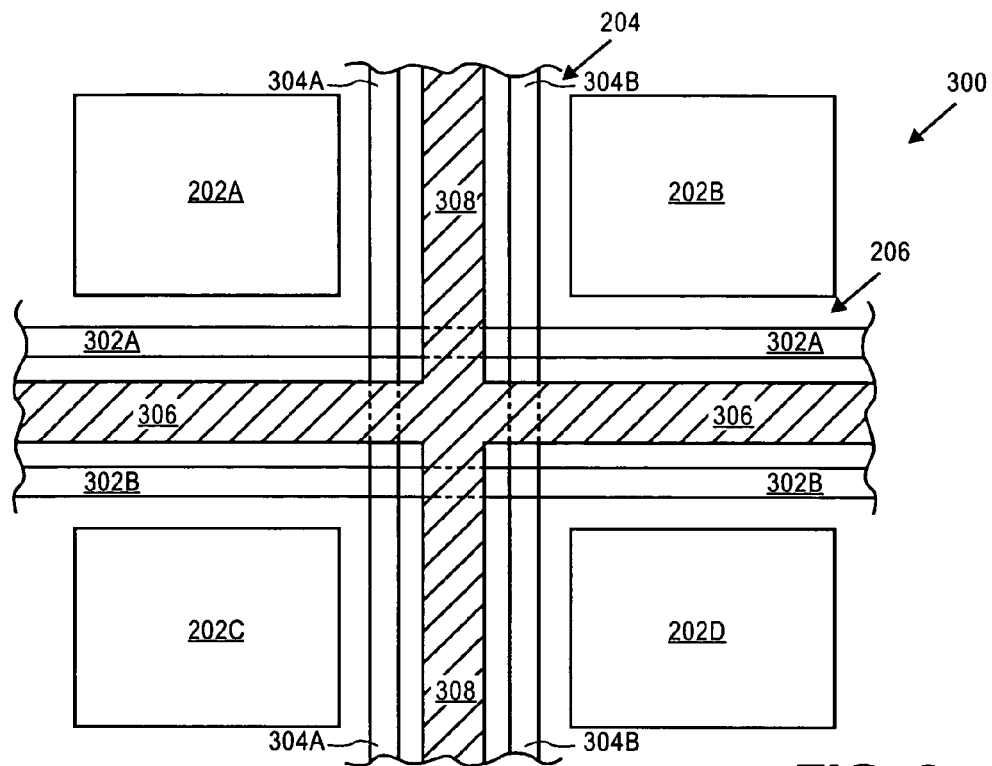
FIGS. 3 and 4 are expanded views of the die shown in FIG. 2 that illustrate alternative techniques for scribing wafers using embodiments of the present invention.
Figure 4:
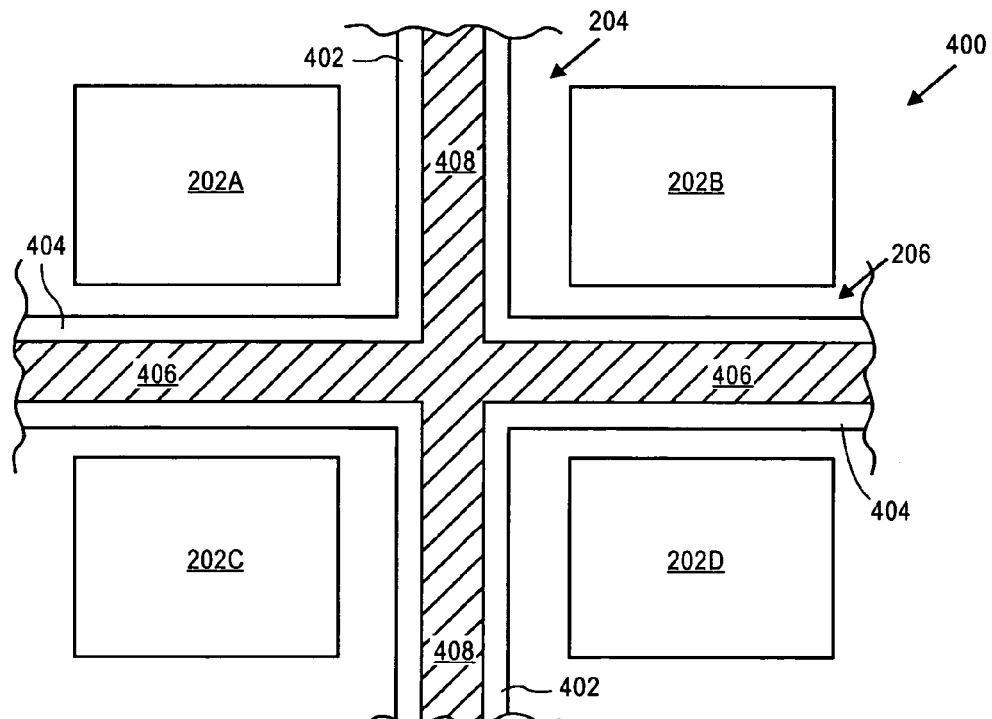

FIGS. 2–4 describe generally methods for scribing semiconductor wafers using an integrated laser system that incorporates one or more embodiments of the present invention. FIG. 2 shows a top-down view of semiconductor wafer 200 that includes semiconductor die 202. The semiconductor die 202 can include circuitry that forms an integrated circuit device, such as a microprocessor, a chipset device, a memory device, or the like. At the intersection of street regions 204 and 206 are dice 202A, 202B, 202C, and 202D. Expanded views of the dice 202A, 202B, 202C, and 202D are shown in FIGS. 3 and 4. FIGS. 3 and 4 will be used to describe the scribing of wafers using a laser that incorporates one or more embodiments of the present invention.

Turning now to FIG. 3, a first method for laser scribing is shown wherein laser kerfs 302A, 302B, and 304A, 304B are formed on either side of street region 206 and 204, respectively. The laser scribes the material in the street region by removing it using a laser that incorporates one or more embodiment of the present invention, thereby forming the laser kerf region. The street region can include dielectric materials such as low-k dielectrics and conductive materials such as copper. The laser kerf region stops in or on the underlying silicon substrate. Next a wafer dicing saw i's used to horizontally cut saw kerf 306 and vertically cut saw kerf 308 through the center of the streets 206 and 208 to remove all dielectric, conductive, and substrate material and thereby singulate the wafer. Here, the laser kerfs 302A, 302B, 304A, and 304B function as crack arrestors and thereby prevent the propagation of cracks that are formed by the saw from extending into the integrated circuit.

An alternative scribing method is disclosed in FIG. 4, whereby laser kerfs 402 and 404 are formed in the center of street regions 204 and 206 respectively. The laser kerfs are wider than the wafer dicing saw blade and extend through the layers of street region material and down to the substrate. Following the laser scribe to form the kerfs 402 and 404, the saw is used to cut through regions of the substrate exposed by the laser kerfs 402 and 404 and singulate the wafer. This technique may be advantageous in that the saw blade does not have to remove the dielectric and metal material in the street region. This can extend the life and reliability of the blade and reduce the overall cost of the sawing process.

Using embodiments of the present invention, many problems encountered with conventional nanosecond laser scribing/dicing are overcome. Using embodiments encompassing the dual source ultrafast-nanosecond approach disclosed herein, the nanosecond laser can now scribe/dice the substrate using less power and as a result, less heat is generated. Less heat means there is less stress, less recast and surface debris, and reduced formation of microcracks and delamination. Also, because the material is ablated by the nanosecond laser pulses, the throughput is higher than that of an ultrafast laser process. Moreover, since the ultrafast laser pulse's primary role is to create a non-equilibrium state in the material system (i.e. excite lattice electrons to the conduction band), and not to ablate the material directly, the ultrafast laser's power density and stability requirements can be significantly relaxed, which means that preventive maintenance and tuning of the ultrafast laser and its beam delivery optical system can be reduced.

Using embodiments encompassing the multi-wavelength scribing process disclosed herein, problems ablating transparent materials can be reduced from a practical point of view by combining a longer wavelength laser system (higher and more stable power output, higher optical quality, and yet lower material absorption coefficient) with a shorter wavelength laser system (higher absorption coefficient at the expense of output power, stability, optical quality and cost) in order to achieve higher scribing quality and efficiency.

The various implementations described above have been presented by way of example only and not limitation. Having thus described in detail embodiments of the present invention, it is understood that the invention defined by the appended claims is not to be limited by particular details set forth in the above description, as many apparent variations thereof are possible without departing from the spirit or scope thereof.

What is claimed is:

1. A method comprising:
   lowering an ablation threshold of portions of a workpiece by repetitively irradiating a first region of the workpiece for durations less than about 10 picoseconds at a first pulse repetition rate of less than about 1 Megahertz (MHz); and
   ablating the portions of the workpiece by repetitively irradiating a second region, substantially coincident with the first, for durations greater than about 10 nanoseconds and less than about 100 nanoseconds at a pulse repetition rate substantially the same as the first, wherein irradiating the second region is synchronized with irradiating the first region so as to temporally overlap in part.

2. The method of claim 1, wherein the workpiece is further characterized as a semiconductor wafer, and wherein a combination of lowering an ablation threshold of portions of the workpiece and ablating portions of the workpiece scribes the semiconductor wafer.

3. The method of claim 2, wherein lowering an ablation threshold is accomplished by projecting a first average power laser onto portions of the workpiece and wherein ablating portions of the workpiece is accomplished by projecting a second higher average power laser onto the workpiece.

4. The method of claim 3, wherein the first region is irradiated prior to the second region and multiphoton absorption lowers the ablation threshold of the regions of the workpiece.

5. The method of claim 2, wherein lowering an ablation threshold is accomplished by projecting a first wavelength laser pulse onto portions of the workpiece, and wherein ablating portions of the workpiece is accomplished by projecting a second, longer wavelength laser pulse onto portions of the workpiece.

6. The method of claim 2, wherein:
   lowering an ablation threshold of the workpiece includes projecting a first laser beam having a first wavelength onto the workpiece; and
   ablating the portions of the workpiece includes projecting a second laser beam having a second wavelength onto the workpiece, wherein the first wavelength is different from the second wavelength, and wherein the first laser beam uses high photon energy single photon absorption to lower the ablation threshold of the workpiece.

7. A laser micromachining method comprising:
   lowering an ablation threshold of a portion of a semiconductor wafer by repetitively irradiating a first region of the workpiece for durations less than about 10 picoseconds at a first pulse repetition rate of less than about 1 Megahertz (MHz); and
   ablating the portion of the semiconductor wafer by repetitively irradiating a second region, substantially coincident with the first, for durations greater than about 10 nanoseconds and less than about 100 nanoseconds at a pulse repetition rate substantially the same as the first, wherein irradiating the second region is synchronized with irradiating the first region so as to temporally overlap in part.

8. The method of claim 7, wherein a combination of lowering an ablation threshold of a portion of the semiconductor wafer and ablating the portion of the semiconductor wafer is a process selected from the group consisting of scribing a semiconductor wafer and dicing a semiconductor wafer.

9. The method of claim 8, wherein a plurality of first irradiating pulses are synchronized to temporally and spatially overlap with a plurality of second irradiating pulses.

10. The method of claim 8, wherein each of the first irradiating pulses is initiated prior to initiating each of the second irradiating pulses.

11. The method of claim 8, wherein:
a first pulse of the first irradiating pulses begins prior to beginning a second pulse of the second irradiating pulses; and
the first pulse ends prior to ending the second pulse.

12. The method of claim 8, wherein time portion of a first pulse in the series of ultrafast laser pulses overlaps with a time portion of a second pulse in the series of nanosecond laser pulses.

13. A laser micromachining method comprising simultaneously projecting first wavelength laser pulses and second, longer wavelength laser pulses onto substantially a same portion of a semiconductor wafer, wherein projecting the first wavelength laser pulses lowers an ablation threshold of the portion of the semiconductor wafer using single-photon absorption and wherein projecting the longer wavelength laser pulses ablates the portion of the semiconductor wafer.

14. The method of claim 13, wherein a wavelength of the first wavelength laser pulses is approximately 266 nanometers and wherein the wavelength of the longer wavelength laser pulses is approximately 355 nanometers.

15. The method of claim 13, wherein a wavelength of the first wavelength laser pulses is less than 355 nanometers and wherein the wavelength of the longer wavelength laser pulses is equal to or greater than 355 nanometers.

16. The method of claim 13, wherein a wavelength of the first wavelength laser pulses is equal to or less than 157 nanometers and wherein the wavelength of the longer wavelength laser pulses is equal to or greater than 248 nanometers.

17. The method of claim 13, wherein a wavelength of the first wavelength laser pulses is equal to approximately 157 nanometers and wherein the wavelength of the longer wavelength laser pulses is equal to approximately 248 nanometers.

18. The method of claim 13, wherein:
projecting the first wavelength laser pulses excites electrons in the portion's valence band to at least one of the wafer material's conduction band or defect states below the conduction band; and
projecting the longer wavelength laser pulses further excites electrons in an excited state created by the first laser beam to vacuum levels.

19. The method of claim 13, wherein further excitation of electrons in an already excited state leads to bond scission and ablation of the portions.

20. A method for removing portions of a semiconductor wafer comprising:
forming a low-k dielectric layer over the semiconductor wafer;
Placing the semiconductor wafer within a dual source laser scribing system that includes a first laser that pulses light for durations of less than 1000 picoseconds and a second laser that pulses light for durations of less than 1000 nanoseconds;
Lowering an ablation threshold of the portions using a first pulse from the first laser; and
ablating portions of the wafer using a second pulse from the second laser, wherein the first pulse and the second pulse are synchronized so as to temporally and spatially overlap in part.

21. The method of claim 20, wherein a first pulse width is less than ten picoseconds.

22. The method of claim 20, wherein a first pulse width is less than one-thousand femtoseconds.

23. The method of claim 20, wherein:
the first pulse begins prior to beginning the second pulse; and
the first pulse ends prior to ending the second pulse.

24. The method of claim 20, wherein a time portion of the first pulse overlaps with a time portion of the second pulse.

* * * * *